(12) United States Patent
Wang et al.

(10) Patent No.: US 11,842,638 B2
(45) Date of Patent: Dec. 12, 2023

(54) PARALLEL REMOTE CONTROL DRIVING SYSTEM FOR INTELLIGENT NETWORK VEHICLE

(71) Applicant: QINGDAO VEHICLE INTELLIGENCE PIONEERS INCORPORATION, Shandong (CN)

(72) Inventors: Feiyue Wang, Qingdao (CN); Bin Tian, Qingdao (CN); Yunfeng Ai, Qingdao (CN); Long Chen, Qingdao (CN); Jing Li, Qingdao (CN); Li Li, Qingdao (CN); Dongpu Cao, Qingdao (CN)

(73) Assignee: QINGDAO VEHICLE INTELLIGENCE PIONEERS INCORPORATION, Shandong (CN)

(*) Notice: Subject to any disclaimer, the term of this patent is extended or adjusted under 35 U.S.C. 154(b) by 243 days.

(21) Appl. No.: 16/981,904

(22) PCT Filed: Apr. 19, 2018

(86) PCT No.: PCT/CN2018/083731
§ 371 (c)(1),
(2) Date: Sep. 17, 2020

(87) PCT Pub. No.: WO2019/178907
PCT Pub. Date: Sep. 26, 2019

(65) Prior Publication Data
US 2021/0134154 A1    May 6, 2021

(30) Foreign Application Priority Data

Mar. 22, 2018 (CN) .................. 201810239901.4

(51) Int. Cl.
*G08G 1/0967*   (2006.01)
*G05D 1/02*     (2020.01)
(Continued)

(52) U.S. Cl.
CPC ..... *G08G 1/096725* (2013.01); *G05D 1/0297* (2013.01); *G08G 1/096811* (2013.01); *H04L 67/12* (2013.01)

(58) Field of Classification Search
CPC ....... G08G 1/096725; G08G 1/096811; G05D 1/0297; G05D 2201/0213; G05D 1/0038; H04L 67/12; H04L 67/52
See application file for complete search history.

(56) References Cited

U.S. PATENT DOCUMENTS

| 10,328,897 B1* | 6/2019 | Nabbe ..................... G06F 21/44 |
| 2017/0193819 A1 | 7/2017 | Vandikas et al. |
| 2019/0064803 A1* | 2/2019 | Frazzoli ................ B60W 50/14 |

FOREIGN PATENT DOCUMENTS

| CN | 103065487 A | 4/2013 |
| CN | 103970084 A | 8/2014 |

(Continued)

OTHER PUBLICATIONS

International Search Report PCT/ISA/210 for International Application No. PCT/CN2018/083731 dated Dec. 10, 2018.
(Continued)

*Primary Examiner* — Kim T Nguyen
(74) *Attorney, Agent, or Firm* — Harness, Dickey & Pierce, P.L.C.

(57) ABSTRACT

A parallel remote control driving system for an intelligent network vehicle, comprising an intelligent network vehicle control device, a parallel driving control and a remote control driving device. The remote control driving device generates, according to a remote control driving request signal from the parallel driving control device, a remote control driving instruction signal, and generates, according to user operations, a driving mode signal and a vehicle control signal and transmits the vehicle control signal to the intelligent network vehicle control device through the par- (Continued)

allel driving control device, for remote control of the intelligent network vehicle. With the parallel remote control driving system, the human driver is no longer necessary when the intelligent network vehicle is on the road. Therefore, the manpower cost including training cost, the technical requirement, and the safety cost of the human driver is significantly reduced, thus facilitating the promotion of intelligent network vehicle.

6 Claims, 3 Drawing Sheets

(51) Int. Cl.
*G08G 1/0968* (2006.01)
*H04L 67/12* (2022.01)

(56) References Cited

FOREIGN PATENT DOCUMENTS

| | | |
|---|---|---|
| CN | 104751669 A | 7/2015 |
| CN | 204537459 U | 8/2015 |
| CN | 106153352 A | 11/2016 |
| CN | 106302432 A | 1/2017 |
| CN | 106394545 A | 2/2017 |
| CN | 206147942 U | 5/2017 |
| CN | 107329482 A | 11/2017 |
| CN | 107463171 A | 12/2017 |
| CN | 107505944 A | 12/2017 |
| WO | WO-2010134824 A1 | 11/2010 |
| WO | WO-2018029101 A1 * 2/2018 ............. B60K 28/02 |  |

OTHER PUBLICATIONS

Chinese Search Report 2018102399014 dated Mar. 22, 2018.
Han et al. Parallel Vehicles Based on the ACP Theory: Safe Trips Via Self-Driving, Mar. 2010.
"Huituo Intelligence: A firm practitioner of the parallel driving concept" *High—Technology and Industrialization*, No. 261. p. 54-57.
Shuangshuang, H et al. "Parallel smart car: Kisen CPSS of connected self-driving cars" *China Automation Conference (CAC2017) and International Intelligent System, Yuan Sheng Innovation Daxuan (CIMIC2017) Proceedings* (2017).

* cited by examiner

PARALLEL REMOTE CONTROL DRIVING SYSTEM FOR INTELLIGENT NETWORK VEHICLE

CROSS-REFERENCE TO RELATED APPLICATIONS

This application is a national phase under 35 U.S.C. § 371 of PCT International Application No. PCT/CN2018/083731 which has an International filing date of Apr. 19, 2018, which claims priority to Chinese Application No. 201810239901.4, filed Mar. 22, 2018, the entire contents of each of which are hereby incorporated by reference.

TECHNICAL FIELD

The present invention belongs to the field of intelligent network driving technology, and specifically relates to a parallel remote control driving system for intelligent network vehicle.

TECHNICAL BACKGROUND

As an important branch of artificial intelligence in the future, intelligent network driving technology can improve safety and efficiency of road traffic, thus greatly changing the way people live and travel. This technology will become one of the most important advanced technologies in the next few years.

Since current intelligent network driving technology is still at an initial development stage, no matter whether an intelligent network vehicle is running on road for test or normal drive, a human driver sitting in the vehicle is necessary for monitoring the state of the vehicle at all times. Accordingly, the human driver can supervise and takeover the operation of the vehicle at an emergency when the vehicle is running.

However, the current driving and controlling method of the intelligent network vehicle is adverse to the improvement of the intelligent network technology and the popularization of the intelligent network vehicle.

SUMMARY OF THE INVENTION

In order to solve the above problems, the present invention provides an intelligent network vehicle control device, comprising: a first communication module, which is in data communication with a parallel driving control device, and configured to transmit driving data of an intelligent network vehicle to the parallel driving control device, and also receive a driving mode signal from the parallel driving control device; and a mode switching module, which is connected to a vehicle control system of the intelligent network vehicle and the first communication module, and is configured to determine a driving mode of the intelligent network vehicle according to the driving mode signal, so that the vehicle control system can control a driving state of the intelligent network vehicle based on a corresponding vehicle control signal.

According to an embodiment of the present invention, the driving mode provided by the mode switching module includes an automatic driving mode, and a remote control driving mode which is superior to the automatic driving mode.

According to an embodiment of the present invention, the vehicle control system is configured to control the driving state of the intelligent network vehicle according to the vehicle control signal generated by the vehicle control system, when a current control mode of the mode switching module is the automatic driving mode; and the vehicle control system is configured to control the driving state of the intelligent network vehicle according to the vehicle control signal from the parallel driving control device, when the current control mode of the mode switching module is the remote control driving mode.

According to an embodiment of the present invention, the mode switching module is configured to switch the control mode from the automatic driving mode that is currently prevail to the remote control driving mode, when receiving the remote control driving signal from the parallel driving control device.

According to an embodiment of the present invention, the mode switching module is configured to generate a remote control driving takeover request signal, when there is a first type of abnormality present in the intelligent network vehicle, and transmit the remote control driving takeover request signal to the parallel driving control device through the first communication module.

The present invention further provides a parallel driving control device, in communication with an intelligent network vehicle control device and a remote control driving device, wherein the parallel driving control device is configured to generate a remote control driving request signal after receiving a remote control driving takeover request signal from the intelligent network vehicle control device, and transmit the remote control driving request signal to the remote control driving device; and the parallel driving control device is further configured to receive a driving mode signal that is generated by the remote control driving device in response to the remote control driving request signal, and transmit the driving mode signal and a vehicle control signal to the intelligent network vehicle control device, so that the intelligent network vehicle control device can determine a driving mode of the intelligent network vehicle according to the driving mode signal.

According to an embodiment of the present invention, the parallel driving control device comprises: a second communication module in connection with the intelligent network vehicle control device, the second communication module being configured to realize data communication between the parallel driving control device and the intelligent network vehicle control device; and a virtual system module in connection with the second communication module, the virtual system module being configured to receive the remote control driving takeover request signal from the second communication module, generate a remote control driving request signal according to the remote control driving takeover request signal, transmit the remote control driving request signal to the remote control driving device, and also transmit the driving mode signal from the remote control driving device to the second communication module.

According to an embodiment of the present invention, the virtual system module is configured to acquire driving data of the intelligent network vehicle from the intelligent network vehicle control device through the second communication module, and determine the driving state of the intelligent network vehicle based on the driving data, and the virtual system module is configured to actively generate the remote control driving request signal and transmit it to the remote control driving device when there is a second type of abnormality present in the intelligent network vehicle.

According to an embodiment of the present invention, the virtual system module comprises: a virtual scene unit, which is used to build a virtual traffic environment and a traffic flow; and a virtual interaction unit connected to the virtual scene unit, the virtual interaction unit being configured to provide a virtual vehicle in the virtual traffic environment, and map the driving state of the intelligent network vehicle using the virtual vehicle according to the driving data of the intelligent network vehicle as obtained, and compare the driving state of the intelligent network vehicle as mapped with a preset reference driving state to monitor the driving state of the intelligent networked vehicle.

According to an embodiment of the present invention, the virtual system module further comprises a virtual simulation unit, which is connected to the virtual interaction unit, and configured to detect related control algorithms of the intelligent network vehicle according to the driving state of the intelligent network vehicle as mapped.

According to an embodiment of the present invention, the virtual system module is further configured to generate simulated state information for a specified virtual scene in a specified period in future according to the driving state of the intelligent network vehicle, generate optimal prediction decision planning information according to the simulated state information, and transmit the optimal prediction decision planning information to the intelligent network vehicle through the second communication module.

According to an embodiment of the present invention, the parallel driving control device further comprises a cloud platform, which is connected to the second communication module and in communication with the intelligent network vehicle control device, and the second communication module performs data communication with the intelligent network vehicle control device through the cloud platform.

According to an embodiment of the present invention, the virtual interaction unit and/or the virtual simulation unit are integrated in the cloud platform.

According to an embodiment of the present invention, the parallel driving control device further comprises a video module connected to the cloud platform, which is configured to receive driving video information about the intelligent network vehicle from the intelligent network vehicle control device, and the video module is configured to download the driving video information from the cloud platform and transmit the driving video information to the remote control driving device.

The present invention further provides a remote control driving device, comprising a driving simulator, which is in communication with a parallel driving control device, and configured to generate a remote driving instruction signal based on a remote control driving request signal from the parallel driving control device, and transmit a driving mode signal and a vehicle control signal both generated by user operation to an intelligent network vehicle control device through the parallel driving control device, so as to realize remote control of the intelligent network vehicle.

According to an embodiment of the present invention, the driving simulator includes a display screen and an operation portion, the display screen being configured to visually display related data from the parallel driving control device while the operation portion being configured to generate the driving mode signal and the vehicle control signal based on user operation and transmit the vehicle control signal to the parallel driving control device.

The present invention further provides a parallel remote control driving system for an intelligent network vehicle, comprising: the intelligent network vehicle control device as mentioned above, the parallel driving control device as mentioned above, and the remote control driving device as mentioned above.

The parallel remote control driving system for intelligent network vehicle as provided by the present invention enables the human driver unnecessary when the intelligent network vehicle is on the road. Therefore, the driver's manpower cost, such as training cost, technical requirements, and safety cost can be significantly reduced, thus facilitating the promotion of intelligent network vehicle.

At the same time, through centralized control based on the parallel driving control device, the system can realize collaboration of multiple vehicles, so that a driver in the control center can remotely control multiple intelligent network vehicles, thereby significantly reducing labor costs and improving management efficiency of the intelligent network vehicles.

In addition, the parallel driving control device can simultaneously supervise and guide the operation of intelligent network vehicles in the real traffic environment. In particular, the parallel driving control device can actively take over the intelligent network vehicle when the vehicle abnormality is detected, although the intelligent network vehicle does not actively request to be taken over. In this manner, traffic safety can be effectively improved.

In addition, the parallel driving control device can also analyze the data of the intelligent network vehicle and the traffic flow information accumulated in the current environment through big data analysis technology, and online predict the actual state of a real intelligent network vehicle in a time period in the future based on real-time state information of the real intelligent network vehicle, and then guide the operation of the intelligent network vehicle in real time. At the same time, the data obtained by the parallel driving control device can also be used to optimize related algorithms offline, thereby efficiently promoting the development of intelligent network vehicles.

Other features and advantages of the present invention will be explained below, and part of them will become self-evident from the description, or be understood by implementing the technical solutions of the present invention. The objects and other advantages of the present invention can be achieved and obtained through the structures and/or processes indicated in the description, the claims, and the drawings.

BRIEF DESCRIPTION OF THE DRAWINGS

In the following the drawings which are necessary for illustrating embodiments of the present invention or the prior arts will be described briefly, in order to enable the technical solutions of the embodiments of the present invention or the prior arts clear. In the drawings.

DETAILED DESCRIPTION OF EMBODIMENTS

In the following the embodiments of the present invention will be described in detail with reference to the accompanying drawings and examples, so that the procedure concerning how the present invention solves technical problems with technical means to achieve corresponding technical effects can be understood and implemented. The embodiments of the present application and various features in the embodiments can be combined with each other as long as there are no conflicts therebetween, and the technical solutions formed by such combinations all fall within the scope of protection of the present invention.

Meanwhile, for the purpose of explanation, in the following many specific details are set forth to provide a thorough understanding of the embodiments of the present invention. However, it is obvious to those skilled in the art that the present invention may be implemented without the specific details or manners described herein.

In addition, the steps shown in the flowchart of the drawings can be executed in a computer system including, e.g., a set of computer-executable instructions, and although a logical sequence is shown in the flowchart, it may be, in some cases, performed in a different order or with different steps as shown or described here.

The current driving control method has high requirements for human drivers and system developments. For example, the current driving control method requires human drivers to know a lot about the intelligent network vehicle, so as to be able to monitor the driving condition of the intelligent network vehicle at all times, and also to find possible dangers and then take over the vehicle in a timely manner. The current driving control method further requires human drivers to be familiar with the switch and takeover of different driving modes. However, in some sudden traffic situations, it is difficult to achieve a smooth takeover and transition of vehicle control. In addition, the current driving control methods for intelligent driving vehicle are focused on manual intervention after vehicle failures, and cannot provide assistance and guidance for driving the intelligent network vehicle based on massive traffic data.

Therefore, the current driving and controlling method of the intelligent network vehicle is adverse to the improvement of the intelligent network technology and the popularization of the intelligent network vehicle. Aiming to solve this problem, the present invention proposes a new intelligent network vehicle control system, namely a parallel remote control driving system, which allows a human driver to control one or more intelligent network vehicles in a manner of parallel remote control driving in a remote end (such as a control center), rather than controlling the intelligent network vehicle in this vehicle.

Figure 1:
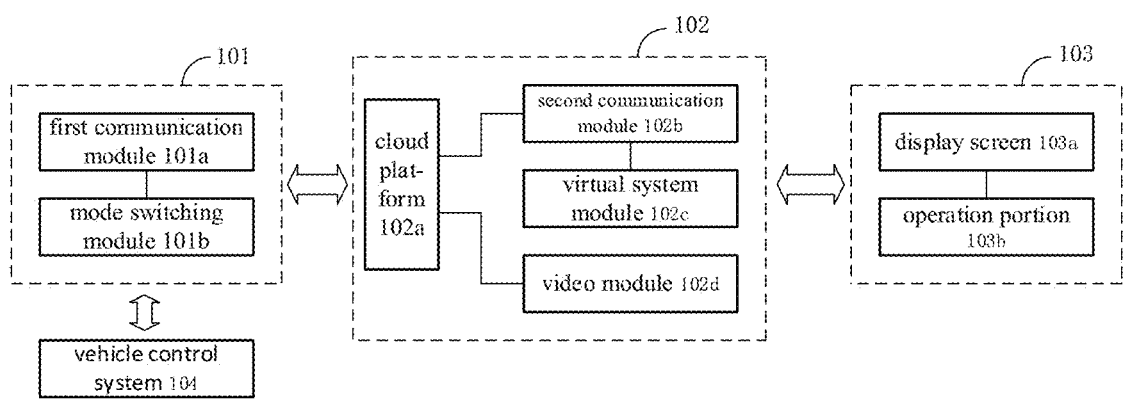
FIG. 1 schematically shows the structure of a parallel remote control driving system for intelligent network vehicle of an embodiment according to the present invention.
Figure 2:
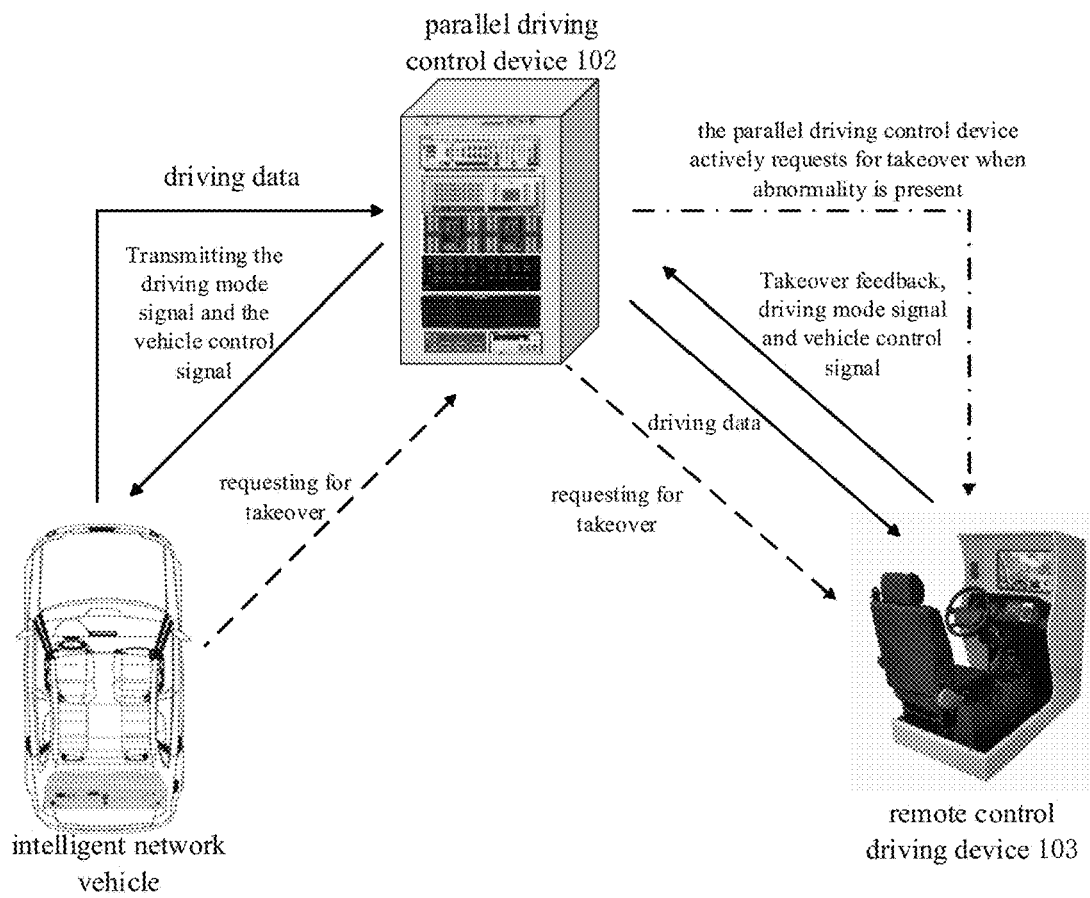
FIG. 2 schematically shows the data flow of the parallel remote control driving system for intelligent network vehicle of an embodiment according to the present invention.

FIG. 1 schematically shows the structure of a parallel remote control driving system for intelligent network vehicle according to an embodiment, while FIG. 2 schematically shows the data flow of the parallel remote control driving system.

As shown in FIG. 1, the parallel remote control driving system for intelligent network vehicle provided by this embodiment includes an intelligent network vehicle control device 101, a parallel driving control device 102, and a remote control driving device 103. Among them, the intelligent network vehicle control device 101 is preferably provided on the intelligent network vehicle, and in communication with a vehicle control system 104 of the intelligent network vehicle. As shown in FIG. 2, the intelligent network vehicle control device 101 can obtain three kinds of real-time information, concerning the intelligent network vehicle, roads, and pedestrians, respectively (that is, the driving data of the intelligent network vehicle), and transmit the above information to the parallel driving control device 102 which is in communication therewith.

Specifically, in this embodiment, the intelligent network vehicle control device 101 preferably includes: a first communication module 101a and a mode switching module 101b. Among them, the first communication module 101a is in communication with the parallel driving control device 102, and can transmit the driving data of the intelligent network vehicle to the parallel driving control device 102, and also receive data, such as the driving mode signal or the like, from the parallel driving control device 102.

The mode switching module 101b is connected to the vehicle control system of the intelligent network vehicle and the first communication module 101a, and can determine the driving mode of the intelligent network vehicle according to the driving mode signal from the first communication module 101a. In this manner, the vehicle control system of the intelligent network vehicle can control the driving state of the intelligent network vehicle based on corresponding vehicle control signal.

In this embodiment, the driving mode provided by the mode switching module preferably includes an automatic driving mode and a remote control driving mode. If the current control mode of the mode switching module 101b is the automatic driving mode, the vehicle control system will control the driving state of the intelligent network vehicle according to the vehicle control signal generated by the vehicle control system per se. That is, the vehicle control system makes autonomous decision and control based on an intelligent driving control algorithm of the vehicle control system through its own sensing and decision-making units or the like, so as to autonomously control the driving state of the intelligent network vehicle.

However, if the current control mode of the mode switching module 101b is the remote control driving mode, the vehicle control system will control the driving state of the intelligent network vehicle according to the vehicle control signal that is transmitted from the parallel driving control device 102 and received through the first communication module 101a.

Of course, in other embodiments of the present invention, the driving mode provided by the mode switching module may also include other reasonable driving modes, and the present invention is not limited in this connection. For example, in one embodiment of the present invention, the driving mode provided by the mode switching module may further include a manual driving mode, wherein the activation thereof requires the presence of a human driver sitting in the intelligent network vehicle, and the manual driving mode is superior to the remote control driving mode in terms of priority. If the current control mode of the mode switching module 101b is the manual driving mode, the driving state of the intelligent network vehicle is controlled by the human driver therein.

In order to ensure the efficiency and safe operation of the intelligent network vehicle, for the mode switching module provided in this embodiment, the priority of the remote control driving mode is superior to that of the automatic driving mode. Specifically, if the current control mode of the mode switching module 101b is the automatic driving mode, the mode switching module 101b will switch the control mode from the automatic driving mode to the remote control driving mode when the remote control driving signal transmitted from the parallel driving control device 102 is received through the first communication module 101a.

In this embodiment, the intelligent network vehicle is provided therein with various functional modules, such as a sensing and positioning module, a decision planning module, a vehicle controlling module, and vehicle body hardware. The sensing and positioning module of the intelligent network vehicle can detect environmental information through devices such as laser radar, millimeter wave radar, camera or the like, and can also obtain the vehicle's positioning information through a combined navigation of inertial navigation and GPS devices. The vehicle control system of the intelligent network vehicle can make decision planning based on the environmental information and positioning information acquired by the sensing and positioning module. When the sensor information is normal and the established motion planning problem can be analyzed, the vehicle control system will transmit the vehicle control signal (such as the longitudinal control signal of the vehicle and/or the lateral control signal of the vehicle, etc.) to the mode switching module 101b.

It should be noted that, in other embodiments of the present invention, the intelligent network vehicle control device 101 may further include other reasonable functional modules according to actual needs, and the present invention is not limited in this connection. For example, in an embodiment of the present invention, the intelligent network vehicle control device 101 may further include an emergency braking module, a human-computer interaction module, and/or an on-board video module.

Among them, the emergency braking module is used for performing electronic emergency braking of the intelligent network vehicle, so as to control the intelligent network vehicle to stop in a short time. For example, when the parallel driving control device 102 detects that the intelligent network vehicle is in a very dangerous situation (for example, there is an obstacle in front of the vehicle) by monitoring the driving state of the intelligent network vehicle, the parallel driving control device 102 will control the emergency braking module directly to perform the emergency braking of the vehicle, thereby avoiding the occurrence of traffic accidents.

The human-computer interaction module can display information of sensing, positioning, driving mode, and various devices of the intelligent network vehicle, so as to provide auxiliary information and interactive functions for the driver in different driving modes. The on-board video module can record and retrieve, in a real time, videos of state and information of the road environment (from the driver's angle), vehicle dashboard and HMI device through an on-board camera.

The mode switching module 101b can simultaneously receive the vehicle control signals from the vehicle control system 104 and the parallel driving control device 102 of the intelligent network vehicle. According to the driving mode signal received, the mode switching module 101b will enable the vehicle control system to control the driving state of the intelligent network vehicle based on respective vehicle control signals.

For example, if the driving mode signal received by the mode switching module 101b is a remote control driving signal, the mode switching module 101b will enable the vehicle control system to control the driving state of the intelligent network vehicle based on the vehicle control signal from the parallel driving control device 102. And, if the driving mode signal received by the mode switching module 101b is an intelligent driving signal, the mode switching module 101b will enable the vehicle control system to control the driving state of the intelligent network vehicle based on the vehicle control signal generated by the vehicle control system itself.

In this embodiment, as shown by the dotted lines in FIG. 2, preferably, when there is a first type of abnormality present in the intelligent network vehicle (for example, when the intelligent network vehicle has damaged sensing or internal failure), the mode switching module 101b will generate a remote control driving takeover request signal, and transmit the remote control driving takeover request signal to the parallel driving control device 102 through the first communication module 101a.

In this embodiment, the parallel driving control device 102 is in communication with the intelligent network vehicle control device 101 and the remote control driving device 103, and can generate a remote control driving request signal when receiving the remote control driving takeover request signal transmitted from the intelligent network vehicle control device 101, and transmit this remote control driving request signal to the remote control driving device 103.

It should be noted that, in order to enable the remote control driving device 103 to be in a state in synchronization with the actual operation state of the intelligent network vehicle as soon as possible when the intelligent network vehicle should be driven remotely, in this embodiment, the parallel driving control device 102 preferably transmits driving data of the intelligent network vehicle as received to the remote control driving device 103 in real time.

In this embodiment, the remote control driving device 103 preferably includes a driving simulator. After receiving the remote control driving request signal sent by the intelligent network vehicle control device 101, the driving simulator will generate a corresponding remote control driving instruction signal according to the remote control driving request signal, so as to inform a human driver to respond to the remote control driving request signal. When the human driver responds to the remote control driving request signal (for example, agrees to perform remote control driving), the remote control driving device 103 will generate a driving mode signal, and also a corresponding vehicle control signal according to the actual operation of the user (that is, perform takeover feedback for the remote control driving request signal). Then, the remote control driving device 103 will transmit the above-mentioned driving mode signal and the vehicle control signal to the intelligent network vehicle control device 101 through the parallel driving control device 102, so as to realize remote control of the intelligent network vehicle.

Specifically, as shown in FIG. 1, in this embodiment, the remote control driving device 103 preferably includes a display screen and an operation portion. Among them, the display screen can visually show relevant data transmitted by the parallel driving control device. For example, the display screen can display, in real time, the driving state of a virtual vehicle in a virtual environment, corresponding to the intelligent network vehicle in the real environment, the driving video of the real vehicle, the road environment video, the data of the vehicle dashboard recorded in real time by the camera in the vehicle, and the information of the HMI module, etc. In this manner, the human driver can be provided with information, such as positioning, sensing, decision planning of the intelligent network vehicle and states of various devices, in real time and in multiple means, so that the human driver can precisely understand the driving conditions of the intelligent network vehicle.

Based on the image displayed on the display screen, corresponding vehicle control signals can be generated by the human driver through operating the operation portion, and these vehicle control signals can be transmitted to the parallel driving control device 102 through the driving simulator, and then to the intelligent network vehicle control device 101. In this manner, the remote manual operation of the intelligent network vehicle control can be realized.

In this embodiment, the operation portion of the driving simulator preferably includes components such as a steering wheel, an accelerator, and a brake pedal, and preferably corresponds to respective operation portions of the intelligent network vehicle. Of course, in other embodiments of the present invention, the operation portions of the driving simulator may further include other suitable components, and the present invention is not limited in this connection.

Parallel driving consists of three parallel worlds. The first level is the physical world, the second level is the spiritual world, and the third level is the artificial world. The physical world mainly refers to the actual operation of real intelligent network vehicle, and the spiritual world mainly refers to the recognition of driving behaviors and intentions.

The artificial world contains two layers. The first layer is a virtual driving layer, which is used to simulate virtual driving behaviors of the virtual driver in the artificial environment. The second layer is an information layer, which mainly contains social factors, geographical factors and sensor information factors. In the artificial world, the controller in each virtual vehicle will interact with other virtual vehicles, the driver's intention of the spiritual world, and the real intelligent vehicles of the physical world, and enhance the modeling accuracy of the virtual system in the artificial world through calculations and experiments, while guiding the actual operations of physical intelligent network vehicles.

The parallel driving control device 102 provided in this embodiment is configured based on the above system of parallel driving. Specifically, as shown in FIG. 1, in this embodiment, the parallel driving control device 102 preferably includes a cloud platform 102*a*, a second communication module 102*b*, a virtual system module 102*c*, and a video module 102*d*.

Among them, the cloud platform 102*a* is connected to the second communication module 102*b*, and further in communication with the intelligent network vehicle control device 101. Data communication between the intelligent network vehicle control device 101 and the second communication module 102*b* can be realized by means of the cloud platform 102*a*.

Specifically, in this embodiment, the intelligent network vehicle control device 101 transmits vehicle driving data (for example, driving video information about the intelligent network vehicle) to the cloud platform 102*a* for storage therein. The video module 102*d* of the parallel driving control device 102 is connected to the cloud platform 102*a*, and can download related video data from the cloud platform 102*a* and send it to the remote control driving device 103, so that the video data can be visually displayed to the remote control driving device 103, in order to assist the driver to perform remote control driving based on the actual traffic environment as displayed.

In this embodiment, data communication between the cloud platform 102*a* and the virtual system module 102*c* can be realized through the second communication module 102*b*. The virtual system module 102*c* can receive the remote control driving takeover request signal transmitted from the intelligent network vehicle control device 101 through the second communication module 102*b* and the cloud platform 102*a*, and generate the remote control driving request signal according to the remote control driving takeover request signal. After obtaining the remote control driving request signal, the virtual system module 102*c* will transmit the remote control driving request signal to the remote control driving device 103, so that the driver can respond to the remote control driving takeover request of the intelligent network vehicle control device 101 through the remote control driving device 103. The virtual system module 102*c* can also transmit the driving mode signal and the vehicle control signal transmitted from the remote control driving device 103 to the second communication module 102*b*, and then the second communication module 102*b* transmits the driving mode signal and the vehicle control signal to the intelligent network vehicle control device 101 through the cloud platform 102*a*. Therefore, the driver can remotely control the operation of the intelligent network vehicle.

According to actual needs, optionally in this embodiment, the virtual system module 102*c* may also be configured to obtain the driving data of the intelligent network vehicle transmitted from the intelligent network vehicle control device 101 through the second communication module 102*b* and the cloud platform 102*a*, and determine the driving state of the intelligent network vehicle according to the driving data, so as to realize the supervision of the driving state of the intelligent network vehicle. As shown by the dotted lines in FIG. 2, if there is a second type of abnormality present in the intelligent network vehicle, the virtual system module 102*c* will actively generate a remote control driving request signal, and transmit the remote control driving request signal to the remote control driving device 103.

The second type of abnormality in the intelligent network vehicle preferably means that abnormal behavior exists in the intelligent network vehicle but the intelligent network vehicle itself does not detect or realize the abnormality. Therefore, the intelligent network vehicle control device 101 cannot actively generate a remote control driving takeover request signal. In this embodiment, the second type of abnormality is usually caused by malfunction of on-board software of the intelligent network vehicle. Of course, in other embodiments of the present invention, the above-mentioned second type of abnormality of the intelligent network vehicle may also be other types of abnormality that cannot be recognized by the intelligent network vehicle itself so that the intelligent network vehicle control device 101 cannot actively generate the remote control driving takeover request signal. The present invention is not limited in this connection.

Figure 3:
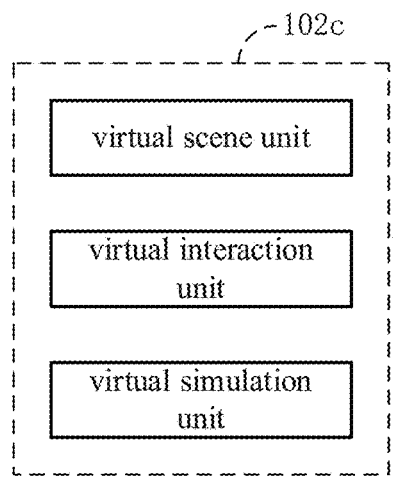
FIG. 3 schematically shows the structure of a virtual system module of an embodiment according to the present invention.

In this embodiment, as shown in FIG. 3, the virtual system module 102*c* preferably includes a virtual scene unit, a virtual interaction unit, and a virtual simulation unit.

Among them, the virtual scene unit is used to build a virtual traffic environment and a traffic flow. Specifically, in this embodiment, the virtual scene unit may provide a variety of optional natural environments, road types, vehicle types, and vehicle sensing and positioning devices to build the virtual traffic environment and the traffic flow. In addition, the virtual scene unit can also build a virtual data scene corresponding to the real environment, based on the real image and position information of the driving area of the intelligent network vehicle transmitted from the intelligent network vehicle control device 101.

The virtual interaction unit connected to the virtual scene unit can provide a virtual vehicle in the virtual traffic environment built by the virtual scene unit, and map the driving state of the intelligent network vehicle using the virtual vehicle based on the driving data of the intelligent network vehicle as obtained. Accordingly, through comparing and analyzing the mapped driving state of the intelligent network vehicle with the preset reference driving state (such as ideal vehicle driving state), the driving state of the intelligent network vehicle can be monitored.

The virtual simulation unit connected with the virtual interaction unit can detect related control algorithms of the intelligent network vehicle according to the mapped driving state of the intelligent network vehicle. In this embodiment, the virtual simulation unit supports devices and algorithms that can manually set traffic environment and vehicle sensing, and detects related algorithms through the operation of the virtual vehicle.

In addition, in this embodiment, optionally the virtual system module may be configured to generate simulated state information for a specified virtual scene in a specified period in the future according to the driving state of the intelligent network vehicle, generate an optimal prediction decision planning information based on the simulated state information, and transmit the optimal prediction decision planning information to the intelligent network vehicle through the second communication module.

In this embodiment, the virtual system module can interact with the remote control driving control device and the real physical environment, so as to map the real driving state of the intelligent network vehicle in real time. The virtual system module can also be operated in a designated artificial traffic scene, so that the driving state of the intelligent network vehicle in a time period in the future can be predicted online based on a large amount of artificial data. Therefore, the simulated state information of the intelligent network vehicle for a specified virtual scene can be obtained in a time period in the future, and the operation of the intelligent network vehicle can be guided based on the simulated state information. In addition, the virtual system module can also use the obtained data to perform an offline optimal algorithm at this time. Compared with a large number of road tests conducted by real intelligent network vehicles, the virtual system module provided in this embodiment can greatly reduce the cost of data acquisition.

Specifically, the virtual simulation unit can use artificial intelligence algorithms, such as big data analysis or the like, to analyze raw data of real vehicles and virtual vehicles from multiple sources in different traffic environments. Based on these data, a corresponding algorithm from the algorithm library can be selected to optimize the sensing, decision-making, planning and controlling algorithms of the intelligent network vehicle in an offline manner, which will be used to guide the operation of the real intelligent network vehicle.

In this embodiment, in order to improve the efficiency of data processing, the virtual interaction unit and/or the virtual simulation unit are preferably integrated in the cloud platform. That means, data operations such as analysis of the driving state of the intelligent network vehicle and/or related big data analysis will be carried out in the cloud platform.

It should be noted that in other embodiments of the present invention, according to actual needs, the parallel driving control device 102 may be configured without the cloud platform 102a and/or the video module 102d, and the present invention is not limited in this connection. For example, when the parallel driving control device 102 is configured without the cloud platform 102a, the virtual system module 102c and the video module 102d will be in data communication with the intelligent network vehicle control device 101 through the first communication module 102b. In the meantime, data operations such as analysis of the driving state of the intelligent network vehicle and/or related big data analysis will be performed locally in the virtual system module 102c.

Figure 4:
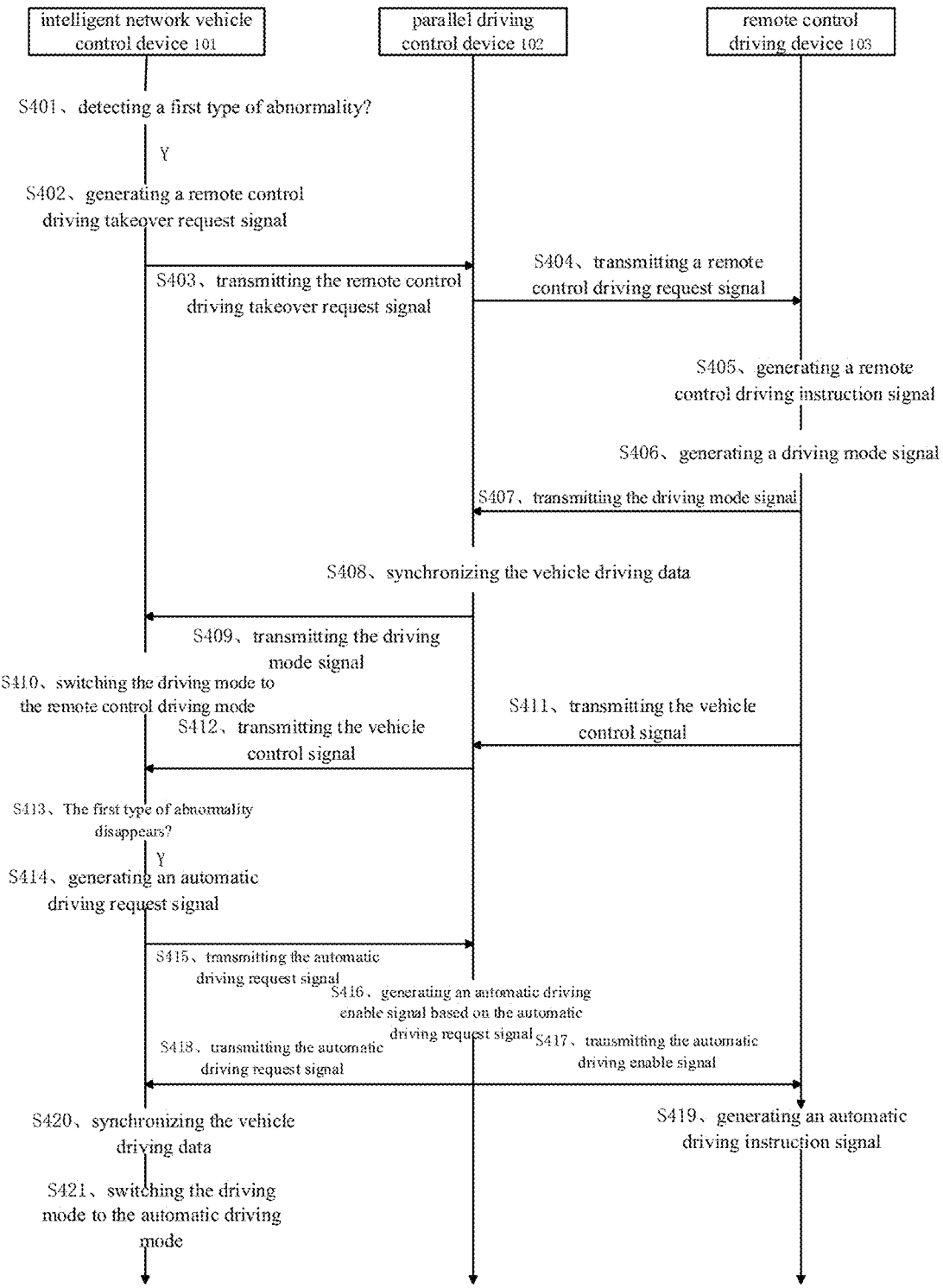
FIG. 4 schematically shows the operation procedure of the parallel remote control driving system of an embodiment according to the present invention.

In order to clearly illustrate the working principle and process of the parallel remote control driving system for an intelligent network vehicle provided in this embodiment, in the following the flow chart of the parallel remote control driving system as shown in FIG. 4 will be described.

As shown in FIG. 4, in this embodiment, in a general traffic scenario, the intelligent network vehicle control device 101 will transmit related driving data (including video information and vehicle state information, etc.) to the parallel driving control device 102 in real time.

Specifically, the intelligent network vehicle control device 101 records the driving video of the vehicle and the state information of the human-computer interaction module through the on-board video module, and transmits the above data to the cloud platform 102a of the parallel driving control device 102 in real time.

The video module 102d of the parallel driving control device 102 downloads relevant video data from the cloud platform 102a, and transmits said video data to the display module of the remote control driving device 103 in real time, for visual display by the display module.

The virtual system module 102c of the parallel driving control device 102 will continuously obtain the vehicle state information of the intelligent network vehicle from the cloud platform 102a through the second communication module 102b, and monitor and guide the driving state of the vehicle according to the vehicle state information. At the same time, in order for the operator to take over the intelligent network vehicle in a timely manner, in this embodiment the virtual system module 102c will synchronize the above vehicle state information to the remote control driving device 103.

As shown in FIG. 4, in driving, the intelligent network vehicle control device 101 continuously detects whether there is a first type of abnormality present in the intelligent network vehicle in step S401. If the first type of abnormality is detected in the intelligent network vehicle, the intelligent network vehicle control device 101 will generate a remote control driving takeover request signal in step S402, and transmit the remote control driving takeover request signal to the parallel driving control device 102, which is in communication therewith, in step S403.

After receiving the remote control driving takeover request signal, the parallel driving control device 102 will generate a remote control driving request signal according to the remote control driving takeover request signal in step S404, and transmits the remote control driving request signal to the remote control driving device 103, which is in communication therewith.

It should be noted that, according to the actual situation, the remote control driving request signal sent by the parallel driving control device 102 to the remote control driving device 103 may also be a remote control driving takeover request signal directly.

After receiving the remote control driving request signal sent by the parallel driving control device 102, the remote control driving device 103 will generate a remote control driving instruction signal in step S405, to inform the driver to remotely drive the intelligent network vehicle at this time.

If the driver sends a positive feedback, he or she can perform corresponding operations after getting ready for the operation to signify the consent to take over the driving of the intelligent network vehicle. Then, at this time, the remote control driving device 103 will generate a driving mode signal in step S406, and transmit the driving mode signal back to the parallel driving control device 102 in step S407.

After receiving the driving mode signal sent by the remote control driving device 103, the parallel driving control device 102 will synchronize the vehicle driving data in step S408. For example, the parallel driving control device 102 synchronizes the current vehicle state information of the intelligent network vehicle to the remote control driving device 103 in step S408. After the synchronization is completed, the remote control driving device 103 preferably sends a formal takeover signal to the parallel driving control device 102, which, in turn, sends the formal takeover signal back to the intelligent network vehicle control device 101 as a remote control driving signal in step S409.

After receiving the remote control driving signal transmitted by the parallel driving control device 102, the intelligent network vehicle 101 will switch the current control mode of the vehicle from the automatic driving mode to the remote control driving mode in step S410.

The driver will operate the remote control driving device 103 to control and drive the intelligent network vehicle based on the vehicle video information and the vehicle state information sent back by the intelligent network vehicle control device 101 in real time. In this procedure, in step S411, the remote control driving device 103 will generate a corresponding vehicle control signal according to the operation of the driver, and transmit the vehicle control signal to the parallel driving control device 102. The parallel driving control device 102 will transmit the vehicle control signal to the intelligent network vehicle control device 101 in step S412, until it exits the remote control driving mode. In this manner, remote control of the intelligent network vehicle can be achieved.

When the intelligent network vehicle is in the remote control driving mode, the intelligent network vehicle control device 101 will continuously detect whether the above-mentioned first type of abnormality disappears in step S413. If the first type of abnormality does not disappear, the intelligent network vehicle will continue to synchronize the vehicle control signal from the remote control driving device 103.

However, if the first type of abnormality disappears, the intelligent network vehicle control device 101 will generate an automatic driving request signal in step S414, and transmit said automatic driving request signal to the parallel driving control device 102 in step S415.

In this embodiment, after receiving the above-mentioned automatic driving request signal, the parallel driving control device 102 will generate an automatic driving enable signal according to the automatic driving request signal in step S416, and transmit the automatic driving enable signal to the remote control driving device 103 in step S417, and at the same time, to the intelligent network vehicle control device 101 in step S418.

In this embodiment, optionally, after receiving the automatic driving signal transmitted from the parallel driving control device 102, the remote control driving device 103 will generate a corresponding automatic driving instruction signal in step S419, so as to inform the driver that it is no longer necessary to remotely control the intelligent network vehicle.

After receiving the automatic driving enable signal transmitted from the parallel driving control device 102, the intelligent network vehicle control device 101 will synchronize the vehicle driving data in step S420, and switch the control mode to the automatic driving mode in step S421. In this way, the remote control driving mode can be switched out.

As can be seen from the foregoing, with the parallel remote control driving system for intelligent network vehicle as provided by the present invention, the human driver is no longer necessary when the intelligent network vehicle is on the road. Therefore, the manpower cost (including training cost), the technical requirement, and the safety cost of the human driver can be significantly reduced, thus facilitating the promotion of intelligent network vehicle.

At the same time, through centralized control based on the parallel driving control device, the system can realize collaboration of multiple vehicles, so that a driver in the control center can remotely control multiple intelligent network vehicles, thereby significantly reducing labor cost and improving management efficiency of the intelligent network vehicles.

In addition, the parallel driving control device can simultaneously supervise and guide the operation of the intelligent network vehicle in the real traffic environment. In particular, the parallel driving control device can actively take over the intelligent network vehicle, when the vehicle abnormality is detected but the vehicle does not actively request to be taken over, thus effectively improving traffic safety.

In addition, the parallel driving control device can also analyze the data of the intelligent network vehicle and the traffic flow information accumulated in the current environment through big data analysis technology, and online predict the actual state of real intelligent network vehicle in a time period in the future based on real-time state information of the real vehicle, and then guide the operation of the intelligent network vehicle in real time. At the same time, the data obtained by the parallel driving control device can also be used to optimize related algorithms in an offline manner, thereby efficiently promoting the development of intelligent network vehicles.

It should be understood that the disclosed embodiments of the present invention are not limited to the specific structures or processing steps disclosed herein, but should extend to equivalent replacements of these features as understood by those of ordinary skill in the relevant art. It should also be understood that the terminologies used herein are for the purpose of describing particular embodiments only, but not for restricting the present invention.

Expressions such as "one embodiment" or "an embodiment" in the description means that the particular features, structures, or characteristics described in connection with the embodiment are included in at least one embodiment of the present invention. Therefore, the expressions "one embodiment" or "an embodiment" in various places throughout the description do not necessarily all refer to the same embodiment.

Although the above embodiments are used to illustrate the principles of the present invention in one or more applications, it is obvious to those skilled in the art that without departing from the principles and ideas of the present invention, various modifications can be made on format, use, and implementation of these embodiments with no creative effort. Therefore, the scope of the present invention is defined by the appended claims.

The invention claimed is:

1. A parallel driving control device in communication with an intelligent network vehicle control device and a remote control driving device, the parallel driving control device comprising:
 a first computer system configured to cause the parallel driving control device to
  generate a first remote control driving request signal
   Better receiving a remote control driving takeover request signal from the intelligent network vehicle control device, transmit the first remote control driving request signal to the remote control driving device,
receive a driving mode signal that is generated by the remote control driving device in response to the first remote control driving request signal, and
transmit the driving mode signal and a vehicle control signal to the intelligent network vehicle control device, the driving mode signal indicating a driving mode of an intelligent network vehicle,
wherein the intelligent network vehicle control device includes a second computer system configured to cause the intelligent network vehicle control device to
transmit driving data of the intelligent network vehicle to the parallel driving control device,
receive the driving mode signal from the parallel driving control device, and
determine a driving mode of the intelligent network vehicle according to the driving mode signal, the driving mode including at least one of an automatic driving mode or a remote control driving mode, the remote control driving mode having a higher priority than the automatic driving mode, and a vehicle control system of the intelligent network vehicle being configured to control a driving state of the intelligent network vehicle according to the vehicle control signal when a current control mode of the intelligent network vehicle control device is the remote control driving mode,
switch the current control mode to the remote control driving mode after receiving a remote control driving signal from the parallel driving control device while the current control mode is the automatic driving mode,
generate a remote control driving takeover request signal when there is a first type of abnormality present in the intelligent network vehicle while the intelligent network vehicle is being driven,
transmit the remote control driving takeover request signal to the parallel driving control device, the remote control driving signal being received in response to the remote control driving takeover request signal,
continuously detect whether the first type of abnormality has disappeared while the intelligent network vehicle is in the remote control driving mode, the intelligent network vehicle continuously synchronizing the vehicle control signal from the remote control driving device in response to detecting that the first type of abnormality has not disappeared,
generate an automatic driving request signal in response to detecting that the first type of abnormality has disappeared,
transmit the automatic driving request signal to the parallel driving control device, and
switch the current control mode to the automatic driving mode,
wherein the first computer system is configured to cause the parallel driving control device to
acquire driving data of the intelligent network vehicle from the intelligent network vehicle control device,
determine a current driving state of the intelligent network vehicle based on the driving data,
actively generate a second remote control driving request signal based on a second type of abnormality being present in the intelligent network vehicle,
transmit the second remote control driving request signal to the remote control driving device, and
monitor the current driving state of the intelligent networked vehicle by,
building a virtual traffic environment and a traffic flow,
providing a virtual vehicle in the virtual traffic environment,
mapping the current driving state of the intelligent network vehicle using the virtual vehicle according to the driving data of the intelligent network vehicle, and
comparing the current driving state of the intelligent network vehicle as mapped with a reference driving state,
wherein remote control driving device includes a third computer system.

2. The parallel driving control device according to claim 1, wherein the first computer system is configured to cause the parallel driving control device to detect related control algorithms of the intelligent network vehicle according to the current driving state of the intelligent network vehicle as mapped.

3. The parallel driving control device according to claim 2, wherein the first computer system is configured to cause the parallel driving control device to:
generate simulated state information for a specified virtual scene in a specified future period according to the driving state of the intelligent network vehicle;
generate optimal prediction decision planning information according to the simulated state information; and
transmit the optimal prediction decision planning information to the intelligent network vehicle.

4. The parallel driving control device according to claim 1, wherein
the parallel driving control device further comprises a cloud platform in communication with the intelligent network vehicle control device; and
the first computer system is configured to cause the parallel driving control device to performs data communication with the intelligent network vehicle control device through the cloud platform.

5. The parallel driving control device according to claim 4, wherein the cloud platform is configured to:
perform the providing the virtual vehicle, the mapping the current driving state, and the comparing the current driving state;
generate simulated state information for a specified virtual scene in a specified future period according to the driving state of the intelligent network vehicle, generate optimal prediction decision planning information according to the simulated state information, and transmit the optimal prediction decision planning information to the intelligent network vehicle; or
perform the providing the virtual vehicle, the mapping the current driving state, and the comparing the current driving state, generate simulated state information for the specified virtual scene in the specified future period according to the driving state of the intelligent network vehicle, generate optimal prediction decision planning information according to the simulated state information, and transmit the optimal prediction decision planning information to the intelligent network vehicle.

6. The parallel driving control device according to claim 4, wherein the first computer system is configured to cause the parallel driving control device to:
receive driving video information about the intelligent network vehicle from the intelligent network vehicle control device;

download the driving video information from the cloud platform; and transmit the driving video information to the remote control driving device.

* * * * *